C. B. BLESSING.
FRUIT JUICE EXTRACTOR.
APPLICATION FILED JULY 31, 1917.
1,258,981.
Patented Mar. 12, 1918.
2 SHEETS—SHEET 1.
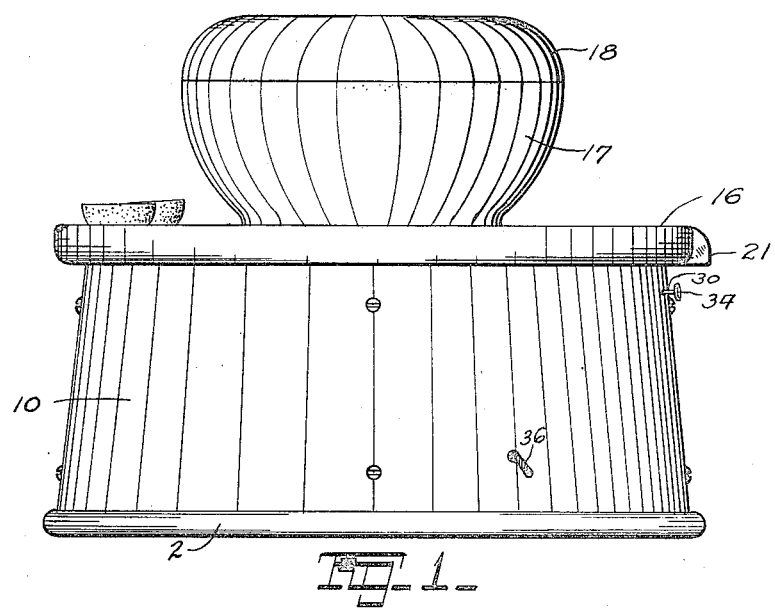
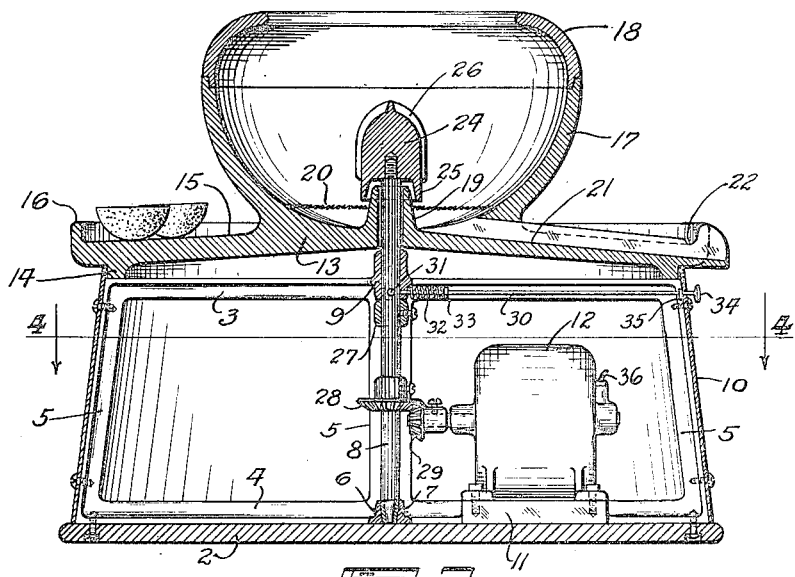
INVENTOR.
CHARLES B. BLESSING
BY Francis St. J. Fox
ATTORNEY

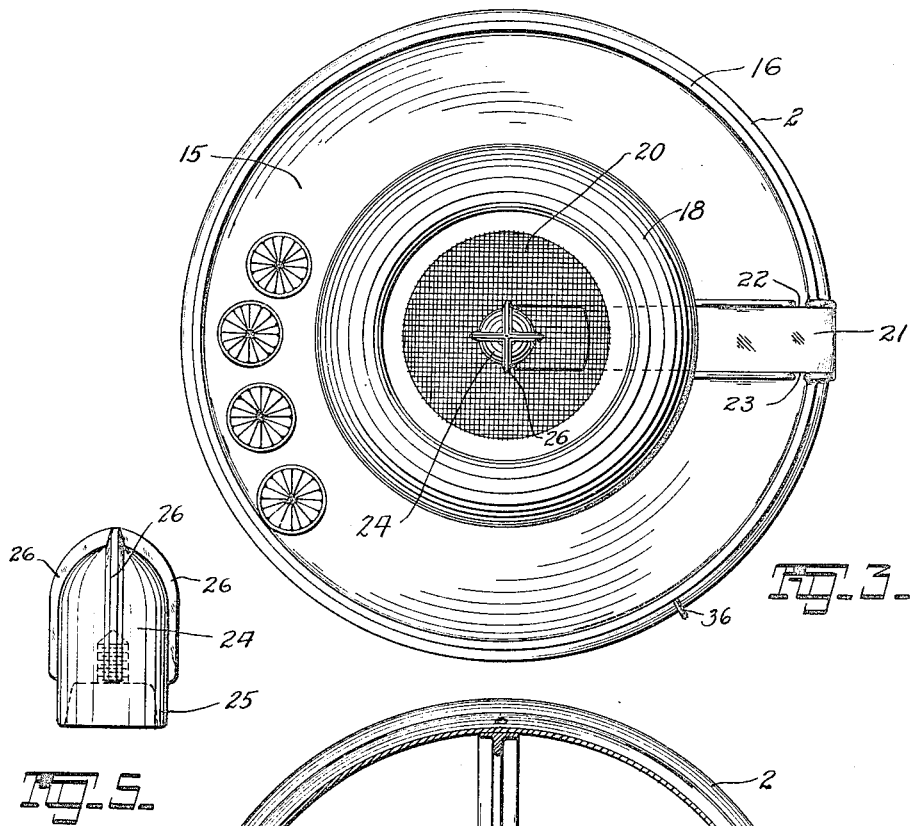
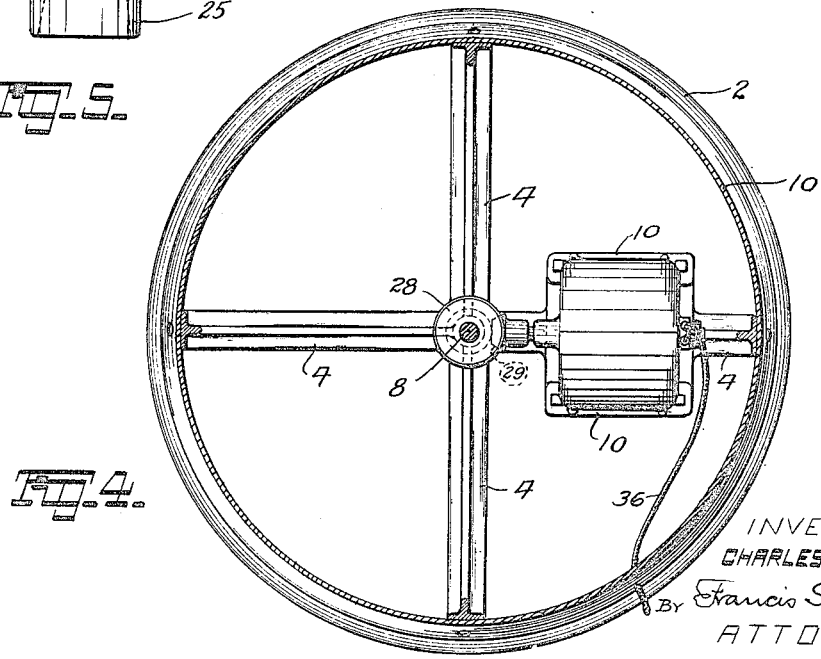

UNITED STATES PATENT OFFICE.

CHARLES B. BLESSING, OF OAKLAND, CALIFORNIA.

FRUIT-JUICE EXTRACTOR.

1,258,981. Specification of Letters Patent. Patented Mar. 12, 1918.

Application filed July 31, 1917. Serial No. 183,731.

*To all whom it may concern:*

Be it known that I, CHARLES B. BLESSING, a citizen of the United States, and a resident of the city of Oakland, county of Alameda, State of California, have invented an Improvement in Fruit-Juice Extractors; and I do hereby declare the following to be a full, clear, and exact description of my invention, such as will enable others skilled in the art to which it appertains to make and use the same.

My invention relates to a fruit juice extractor, and it is especially adapted for use in the extraction of the juices of citrus fruits; and it consists in the novel arrangement and construction of parts hereinafter described.

The object of my invention is to provide an easily-operated power-driven extractor of this type, capable of being driven at high speed, and one in which is combined efficiency, simplicity and cleanliness.

In order that my invention may be clearly understood and readily carried into effect, the same is described with reference to the accompanying drawings, in which similar numerals indicate like parts:—

Figure 1 is an exterior view of my extractor.

Fig. 2 is a vertical sectional view of the same.

Fig. 3 is a plan view of the same.

Fig. 4 is a horizontal section of Fig. 2, taken on the line 4—4.

Fig. 5 is an enlarged view of the bulb carried by the rotary member.

In detail, my construction consists of a base, 2, to which is affixed a frame comprised of top and bottom cross-portions, 3 and 4, respectively, tied together with slightly tapering standards, 5. At the center of the lower cross-portion, 4, is a suitable boss, 6, provided with a bushing, 7, which constitutes a bearing for the slightly reduced lower end of the rotatable shaft, 8. At the center of the top cross-portion, 3, is a boss-bearing, 9, for the said shaft, 8. Surrounding the said standards, 5, and suitably attached thereto is a casing, 10. On the bottom cross-portion of the said frame is an extended base, 11, upon which I mount a suitable electric motor, 12, by means of which the extractor is operated. Current is supplied to the said motor through the wire, 36, connecting with any suitable power source.

A circular cover, 13, is provided with a downwardly projecting circular flange, 14, which fits snugly within the extended portion of the casing, 10, and rests upon the top cross-portion, 3. The upper side of the base of the said cover is available as and constitutes a slightly outwardly inclined shelf, 15, for the fruit. The rim, 16, of the said shelf is turned up to prevent the escape of any juice which may exude from cut fruit placed on the shelf. Integral with the base of the said cover and rising from the central portion thereof is a circular hollow bowl, 17, open at the top and adapted to receive the removable guard, 18. The center portion of the said cover has an upwardly projecting boss, 19, provided with an opening therein slightly larger than the diameter of the rotatable shaft, 8, which extends therethrough. Inside of the bowl and resting on the inner sides thereof is a screen, 20, which rests upon and surrounds the said boss, 19, a suitable distance below the top thereof. Entering the bowl, 17, through a suitable opening therein is an outwardly inclined discharge-channel, 21, which constitutes a spill-way for the extracted juice. The walls of the discharge-channel nearest the rim, 16, are cut away, as at 22 and 23, to permit the escape of any juice which may have exuded from cut fruit placed on the shelf to flow into the said discharge-channel.

The rotatable shaft, 8, is threaded at its upper end to receive the extracting bulb, 24. This bulb is provided with a circular flange, 25, which projects downward a distance to enable it to surround that portion of the said boss, 19, which projects above the screen, 20. When the extractor is being operated the upwardly projecting boss, 19, and the downwardly projecting flange, 25, prevent any of the extracted juice from entering the opening of the shaft, 8, and consequently there is no loss of juice. The bulb, 24, has downwardly curved rib-portions, 26, which aid in the extraction of the juice. A collar, 27, secured to the shaft, 8, prevents any vertical movement of the shaft. Suitably fastened to the shaft, 8, is a gear, 28, meshing with a gear, 29, secured to the shaft of the motor, 12, which comprises the operating mechanism for rotating the said shaft, 8, which carries the extractor-bulb, 24. As the said bulb is screwed on the shaft, 8, in a direction opposite to the direction of the rotations of the said shaft, the bulb will not unscrew when the extractor is in operation.

By means of a rod, 30, adapted to engage an opening, 31, in the shaft, 8, the said shaft may be held stationary when the bulb, 24, is being screwed either on or off the said shaft. The rod, 30, extends through suitable openings cut in the casing, 10, and the boss, 9, and it is supported at each end by said casing and boss. A coiled spring, 32, encircling the said rod and compressed between the boss, 9, and a collar, 33, secured to the said rod keeps the latter when not in use out of engagement with the said shaft, 8. A stop, 35, suitably secured to the rod holds the same in its proper position against the action of the spring. The rod is also provided at its outer end with a push-button, 34.

My extractor is operated as follows: The operator starts the motor which causes the shaft carrying the ribbed-bulb to rotate. Cut fruit is then held against the bulb. The exuding fruit juice, thrown against the inner surfaces of the bowl by the action of the revolving bulb, runs down the sides of the bowl and flows through the discharge-channel into any suitable container. The screen prevents any dislodged fruit pulp commingling with the fruit juice. To cleanse the extractor after use, the rod, 30, is inserted in the opening, 31, in the shaft, 8, and the bulb unscrewed. The screen and cover may then be removed and cleansed with ease.

Having thus described my invention, what I desire to claim and to secure by Letters Patent, is:

1. In a machine of the character described, a frame suitably affixed to a base, a casing for said frame, a cover for said frame and casing, the central portion of which rises to form a bowl, a boss projecting upward from the bottom central portion of said bowl, a rotary member journaled in said frame and extending upward through said boss within said bowl and carrying a removable ribbed-bulb at its upper end, a downwardly projecting circular flange on said bulb encircling the upper portion of said boss within the bowl, a discharge-channel opening out of said bowl, a pulp screen within said bowl, and means for rotating said rotary member.

2. In a machine of the character described, a frame suitably affixed to a base, a casing for said frame, a cover for said frame and casing, a bowl integral with and rising from the central portion of said cover, a boss projecting upward from the bottom of said bowl, a rotary member journaled in said frame extending upward through said boss with its upper end within said bowl and carrying a removable ribbed-bulb encircling the upper portion of said boss, a discharge-channel for said bowl, means for holding said rotary member stationary when said bulb is being placed thereon or removed therefrom, and means for rotating said rotary member.

3. In a machine of the character described, a base, a frame affixed thereto, a casing for said frame, a cover for said frame and casing, the outer portion of said cover forming an outwardly declining shelf with upturned rim, a bowl integral with and rising from the central portion of said cover and provided with a suitably seated detachable guard at its top portion, an upwardly projecting boss within the central lower portion of said bowl, a rotary member journaled in said frame with its upper end within the said bowl and carrying a removable ribbed-bulb, the downwardly projecting circular flange of which surrounds the top portion of the said upwardly projecting boss, a discharge-channel entering said bowl, a pulp-screen within said bowl, and means for rotating said rotary member.

In witness whereof, I have hereunto set my hand at San Francisco, California, this 25th day of July, A. D., 1917.

CHARLES B. BLESSING.